United States Patent [19]
Sasaki et al.

[11] Patent Number: 5,153,079
[45] Date of Patent: Oct. 6, 1992

[54] MAGNETIC RECORDING MEDIUM COMPRISING FERROMAGNETIC POWDER AND POLAR GROUP CONTAINING GINDER RESINS HAVING DIFFERENT GLASS TRANSITION TEMPERATURES

[75] Inventors: Kunitsuna Sasaki; Kiyoshi Sawada; Ryosuke Isobe; Takahiro Mori; Yuki Ando, all of Hino, Japan

[73] Assignee: Konica Corporation, Tokyo, Japan

[21] Appl. No.: 806,819

[22] Filed: Dec. 6, 1991

Related U.S. Application Data

[63] Continuation of Ser. No. 629,465, Dec. 18, 1990, abandoned.

[30] Foreign Application Priority Data

Dec. 28, 1989 [JP] Japan .................................. 1-339750

[51] Int. Cl.$^5$ ............................................. G11B 5/00
[52] U.S. Cl. ................... 428/694; 428/424.6; 428/425.9; 252/62.54
[58] Field of Search .............. 428/900, 694, 424.6, 428/425.9; 252/62.54

[56] References Cited
U.S. PATENT DOCUMENTS 4,784,907 11/1988 Matsufuji et al. .................... 428/328
4,861,655 8/1989 Karle .................................... 428/328

*Primary Examiner*—Paul J. Thibodeau
*Assistant Examiner*—Stevan A. Resan
*Attorney, Agent, or Firm*—Jordan B. Bierman

[57] ABSTRACT

A magnetic recording medium is disclosed which comprises a non-magnetic support and a magnetic layer comprising a ferromagnetic powder having a specific surface area of not less than 55 m$^2$/g and at least two kinds of resins each containing repetitive units having a polar group selected from the group consisting of a —SO$_3$M group, a —OSO$_3$M group, a —COOM group and a —PO(OM')$_2$ group, wherein M is a hydrogen atom or an alkali metal atom, and M' is a hydrogen atom, an alkali metal atom or an alkyl group, and the glass transition points of said two resins are different not less than 60° C. from each other. The recording medium is improved in the dispersibility of the ferromagnetic powder in the magnetic layer and has a satisfactory surface smoothness, high electromagnetic conversion characteristics and a satisfactory running durability.

13 Claims, 1 Drawing Sheet

MAGNETIC RECORDING MEDIUM COMPRISING FERROMAGNETIC POWDER AND POLAR GROUP CONTAINING GINDER RESINS HAVING DIFFERENT GLASS TRANSITION TEMPERATURES

This application is a continuation of application Ser. No. 07/629,465, filed Dec. 18, 1990, now abandoned.

FIELD OF THE INVENTION

The present invention relates to a magnetic recording medium such as a magnetic tape and a magnetic disk.

BACKGROUND OF THE INVENTION

In general, a magnetic recording medium such as a magnetic tape is produced by coating and drying a magnetic paint comprising a ferromagnetic powder and a binder on a nonmagnetic support.

In a magnetic recording medium, particularly a magnetic recording medium for video use which requires a high-frequency recording, there has lately been a demand for increasing the recording density. With the demand for higher-density recording, a further finer particulate and high-coercive ferromagnetic powder having a specific surface area of 55 m$^2$/g has come into use.

However, as the ferromagnetic powder becomes finer particulate and highly coercive, its individual particles are liable to strongly aggregate, which makes it difficult to provide any sufficient dispersibility and surface smoothness necessary for obtaining a high reproduction output and good S/N ratio in the high frequency recording. This tendency is remarkable particularly in a ferromagnetic metal powder. In a magnetic recording medium containing a ferromagnetic powder not sufficiently dispersed therein, the magnetic powder contained in its layer is liable to shed therefrom to thereby cause an undesirable phenomenon such as clogging of a magnetic head, which deteriorates its running durability.

To improve such a magnetic recording medium by getting rid of the above shortcomings, Japanese Patent Publication Open to Public Inspection (hereinafter referred to as Japanese Patent O.P.I. Publication) No. 146433/1987 discloses a technique to improve the dispersibility of a ferromagnetic powder by incorporating into a magnetic layer both a resin comprising a repetitive unit containing a polar group and having a glass transition point of not less than 50° C and a resin comprising a repetitive unit containing a polar group and having a glass transition point of not more than 50° C, and also to improve the running durability by using both a fatty acid ester lubricant and a non-fatty acid ester lubricant in combination.

As a result of the investigation by the inventors, however, it has been found that, where a ferromagnetic powder is made into so fine particles as to have an increased specific surface area of not less than 55 m$^2$/g, even though a magnetic layer contains a resin comprising a repetitive unit containing a polar group and having a glass transition point of not less than 50° C. and a resin comprising a repetitive unit containing a polar group and having a glass transition point of not more than 50° C., if the difference between the glass transition points is not sufficiently large, neither a sufficient dispersibility of the magnetic powder required for high-frequency recording nor a sufficient surface smoothness of the magnetic layer can be obtained.

SUMMARY OF THE INVENTION

It is an object of the present invention to provide a magnetic recording medium which comprises a fine particulate ferromagnetic powder having an excellent dispersibility, and a magnetic layer with a satisfactory surface smoothness, which result in providing high-level electromagnetic conversion characteristics and a satisfactory running durability.

The present invention relates to a magnetic recording medium having a magnetic layer containing a magnetic powder and a binder, in which said magnetic powder has a specific surface area of not less than 55 m$^2$/g and said binder is composed of at least two kinds of resins each containing repetitive units containing at least one polar group selected from the group consisting of —SO$_3$M, —OSO$_3$M, —COOM and —PO(OM')$_2$, wherein M is a hydrogen atom or an alkali metal atom such as Na, K or Li, and M' is a hydrogen atom, an alkali metal atom such as Na, K or Li, or an alkyl group such as —CH$_3$ or —C$_2$H$_5$; and the difference between the glass transition points of said at least two kinds of resins is not less than 60° C.

BRIEF DESCRIPTION OF THE DRAWING

The accompanying drawing is an enlarged cross-sectional view of an example of the magnetic recording medium of the invention.

DETAILED DESCRIPTION OF THE INVENTION

Figure 1:
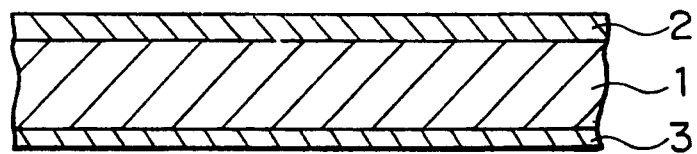

In the magnetic recording medium of the invention, the binder for the magnetic layer comprises the two resin components having glass transition points between which the difference is not less than 60° C. and having specific polar groups mentioned above. Generally, a resin having a higher glass transition point (hereinafter called high Tg resin) provides a hardness or stiffness necessary for the magnetic layer, while a resin having a lower glass transition point (hereinafter called low Tg resin) provides a softness or elasticity necessary for the magnetic layer. However, an important factor for forming a satisfactory magnetic recording medium is the balance in the mixed or molten state of the resins. For example, merely raising the glass transition point of a high Tg resin to increase the magnetic layer's durability causes the physical properties thereof to be fragile, while lowering the glass transition point of a low Tg resin provides satisfactory physical properties to the magnetic layer without impairing the elasticity thereof. On the contrary, when lowering the glass transition point of the low Tg resin in order to improve the dispersibility of the ferromagnetic powder and the surface smoothness of the magnetic layer, the dispersibility and the surface smoothness after its calender treatment are surely improved, but, as such, the magnetic layer becomes so adhesive as to sometimes cause a problem in the running durability. At the same time, however, by raising the glass transition point of the high Tg resin to balance, it is possible to make up for such disadvantages of the magnetic layer.

Furthermore, since both high and low Tg resins each have a polar group, the binding force of the resins as binders with the ferromagnetic powder is strengthened to result in improving the magnetic powder dispersibility and reducing the occurrence of shedding.

In other words, the binder comprising at least two different resin components having different glass transition points between which the difference is not less than 60° C. and each having a specific polar group enables to provide a necessary dispersibility for the ferromagnetic powder having a specific surface area of not less than 55 m²/g and a surface smoothness for the magnetic layer, and thus it is possible to make satisfactory electromagnetic conversion characteristics and running durability compatible. If the difference between the glass transition points is less than 60° C., the above effects cannot be obtained, so that the difference is preferably not less than 60° C., more preferably not less than 65° C., and most preferably 70° to 100° C.

As the ferromagnetic powder in the invention, those usually employed for conventional magnetic recording mediums may be used, which include oxidated magnetic compounds such as $\gamma$-$Fe_2O_3$, Co-containing $\gamma$-$Fe_2O_3$, Co-adhered $\gamma$-$Fe_2O_3$, $Fe_3O_4$, Co-containing $Fe_3O_4$, Co-adhered $Fe_3O_4$, Co-containing magnetic $FeOx$ ($3/2 > X > 4/3$) and $CrO_2$. A hexagonal ferrite such as barium ferrite and iron nitride may also be used.

Examples of the ferromagnetic metal powder include Fe, Ni, Co, and metallic powders comprised principally of Fe, Ni and Co, such as Fe—Al, Fe—Al—Ni, Fe—Al—Zn, Fe—Al—Co. Fe—Ni, Fe—Ni—Al, Fe—Ni—Co, Fe—Ni—Si—Al—Mn, Fe—Ni—Si—Al—Zn, Fe—Al—Si, Fe—Al—Ca, Fe—Ni—Zn, Fe—Ni—Mn, Fe—Ni—Si, Fe—Mn—Zn, Fe—Co—Ni—P and Co—Ni powders. Among these powders, the Fe-type metallic powders are excellent in the electric characteristics, and preferred among them from the corrosion resistance and dispersibility points of view are the Fe—Al, Fe—Al—Ni, Fe—Al—Zn, Fe—Al—Co, Fe—Ni, Fe—Ni—Al, Fe—Ni—Zn, Fe—Ni—Al—Si—Zn. Fe—Ni—Al—Si—Mn and Fe—Ni—Co powders.

The ferromagnetic metal powder is more preferably of a structure in which the Fe:Al content ratio by the number of atoms is 100:1 to 100:20, and the Fe and Al atoms which are present in the surface area of not more than 100 Å at the depth of an ESCA analysis is in the Fe:Al content ratio by the number of atoms of 30:70 to 70:30. The ferromagnetic powder also preferably contains Fe, Ni, Al and Si atoms, and more preferably additionally contains at least one of Zn and Mn atoms, wherein the Fe content is not less than 90 atom %, the Ni content is 1 to 10 atom %, the Al content is 0.1 to 5 atom %, the Si content is 0.1 to 5 atom %, the Zn content and/or Mn content (total content when both are contained) is 0.1 to 5 atom %, and the Fe, Ni, Al, Si, Zn and/or Mn atoms which are present in the surface area of not more than 100A at the depth of the ESCA analysis of the above ferromagnetic powder are in the Fe:Ni:Al:Si:Zn and/or Mn content ratio of 100:4 or less:-10-60:10-70:20-80.

In the invention, a ferromagnetic powder having a specific surface area of not less than 55 m²/g is used for a high recording density.

The specific surface area of the ferromagnetic powder in the invention is defined by expressing in terms of square meters the surface area per gram measured according to a specific surface area measuring method called BET method. The specific surface area and the measuring method therefor are detailed in the Measurement of powders by J. M. Dallavalle, Clydeorr Jr., and the Kagaku-Benran (Handbook of Chemistry), Application Section, pp. 1170-1171, compiled by the Chemical Society, Japan. The measurement of the specific surface area may be carried out, for example, in the manner that a ferromagnetic powder is subjected to heat treatment at around 105° C. for 13 minutes for deaeration and removal of impurities therefrom, and then conducted into a measuring instrument, wherein the initial pressure of nitrogen is set at 0.5 kg/m², and an adsorption measurement is made with nitrogen for 10 minutes at a liquid nitrogen temperature of $-195°$ C. As the measuring instrument a Quantasorb, manufactured by Yuasa Ionics Co., may be used.

The binder of the invention, as previously mentioned, is comprised of at least two different resin components having different glass transition points between which the difference is not less than 60° C. and each containing a repetitive unit having at least one polar group selected from the group consisting of —$SO_3M$, —$OSO_3M$, —COOM and —$PO(OM')_2$.

Of the resins as the binder of the invention, the high Tg resin has a glass transition point of preferably 50° C. to 90° C., and more preferably 55° C. to 85° C., while the low Tg resin has a glass transition point of preferably $-40°$ C. to 0° C., and more preferably $-35°$ C. to $-5°$ C. As the high Tg resin of the invention there may be used ordinary binders for conventional magnetic recording mediums into which is introduced a polar group, said ordinary binders including vinyl chloride resins, cellulose derivatives, polyurethane resins and polyester resins. As the low Tg resin there may be used normal binders for conventional magnetic recording mediums into which is introduced a polar group, said normal binders including polyurethane resins and polyester resins. The above resin's glass transition point varies according to the type of component and crystallization degree of each resin. The molar ratio of repetitive units having the polar group to the total repetitive units in each of the high Tg resin and low Tg resin is preferably 0.1 to 8.0 mole %, and more preferably 0.5 to 5.0 mole %. The weight average molecular weight of each resin is preferably 15,000 to 50,000.

The polar group is well adaptable to a ferromagnetic powder and accelerates the dispersion of the powder into the binder.

The binder content of the magnetic layer is normally 10 to 40 parts by weight per 100 parts by weight of the ferromagnetic powder. The using amount ratio by weight of the high Tg resin and low Tg resin is usually 90:1 to 10:90, and preferably 70:30 to 30:70.

Next, synthesis of the vinyl chloride copolymer in the invention is described below:

The vinyl chloride copolymer preferably used as the binder in the invention can be synthesized by the reaction between a copolymer containing a OH group such as a vinyl chloride-vinyl alcohol copolymer and one of the following compounds each containing a chlorine atom and a polar group:

$ClCH_2CH_2SO_3M$,
$ClCH_2CH_2OSO_3M$,
$ClCH_2PO(OM')_2$,
$ClCH_2COOM$.

To take the $ClCH_2CH_2SO_3Na$ as an example, the reaction is as follows:

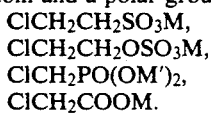

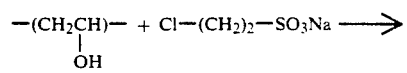

-continued

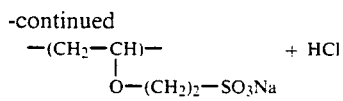

There is another synthesis method, in which copolymerizable monomers are used for copolymerization. That is, prescribed amounts of reactive monomers each having a unit containing a polar group are put in an autoclave with another monomer such as vinyl chloride monomer, and the copolymerization thereof takes place in the presence of a common polymerization initiator, e.g., a radical polymerization initiator such as benzoyl peroxide (BPO) and azobisisobutyronitrile (AIBN), redox polymerization initiator, anionic polymerization initiator, cationic polymerization initiator, and the like. Examples of the reactive monomer for introducing sulfonic acid or a salt thereof include unsaturated hydrocarbon sulfonic acids such as vinylsulfonic acid, allylsulfonic acid, methacrylsulfonic acid and p-styrenesulfonic acid and salts thereof: acrylic acid or methacrylic acid sulfoalkyl esters such as 2-acrylamido-2-methylpropanesulfonic acid, (metha)acryl acid sulfoethyl ester and (metha)acrylic acid sulfopropyl ester and salts thereof: and acrylic acid-2-sulfonic acid ethyl ester.

There may be used (metha)acrylic acid or maleic acid for introducing a carboxylic acid or a salt thereof, and a (metha)acrylic acid-2-phosphoric acid ester for introducing phosphoric acid or a salt thereof.

It is preferable that an epoxy group be introduced in the vinyl chloride copolymer in order to improve the stability to heat of the vinyl chloride copolymer. The epoxy group-having repetitive unit content of the copolymer is preferably 1 to 30 mole %, and more preferably 1 to 20 mole %. As the monomer to be introduced, glycidyl acrylate is preferably used.

Relating to the introduction of the polar group into the vinyl chloride copolymer, there are descriptions in Japanese Patent O.P.I. publication Nos. 44227/1982, 108052/1983, 8127/1984, 101161/1985, 235814/1985, 238306/1985, 238371/1985, 121923/1987, 146432/1987 and 146433/1962, and the descriptions are useful for the invention.

Subsequently, syntheses of the polyester and polyurethane in the invention are described:

Generally, the polyester can be obtained by the reaction of a polyol and a polybasic acid. Utilizing this known method, a polybasic acid having a polar group is used as a part of polybasic acids, whereby a polyester polyol having a polar group can be synthesized.

Examples of the polybasic acid include phthalic acid, isophthalic acid, terephthalic acid, adipic acid, azelaic acid, sebacic acid and maleic acid. Examples of the polybasic acid having a polar group include 5-sulfoisophthalic acid, 2-sulfoisophthalic acid, 4-sulfoisophthalic acid, 3-sulfophthalic acid, 5-sulfoisophthalic acid dialkyl, 2-sulfoisophthalic acid dialkyl, 4-sulfoisophthalic acid dialkyl, 3-sulfophthalic acid dialkyl and the sodium and potassium salts thereof. Examples of the polyol include trimethylolpropane, hexanetriol, glycerol, trimethylolethane, neopentylglycol, pentaerythritol, ethylene glycol, propylene glycol, 1,3-butanediol, 1,4-butanediol, 1,6-hexanediol, diethylene glycol and cyclohexane dimethanol.

Different other polar group-introduced polyesters may also be synthesized by the known method.

For the synthesis of the polyurethane there may be used a generally known method for the reaction of a polyol and a polyisocyanate. As the polyol component, generally a polyester polyol that is obtained by the reaction between a polyol and a polybasic acid may be used. Therefore, if the above polar group-having polyester polyol is utilized as a raw material, the polyurethane having a polar group can be synthesized. Examples of the polyisocyanate component include diphenylmethane-4,4'-diisocyanate (MDI), hexamethylenediisocyanate (HMDI), tolylenediisocyanate (TDI), 1,5-naphthalenediisocyanate (NDI), tolidinediisocyanate (TODI) and lysineisocyanate methyl ester (LDI).

The polyurethane can also be synthesized otherwise by the addition reaction of a polyurethane having a OH group and one of the following compounds each having a polar group and a chlorine atom:

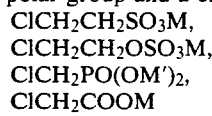

Descriptions relating to the introduction of a polar group into the polyurethane are found in Japanese Patent Examined Publication No. 41565/1983, Japanese Patent O.P.I. Publication Nos. 92422/1982, 92423/1982, 8127/1984, 5423/1984, 5424/1984 and 121923/1987, which are useful for the invention.

The binder of the invention may, in addition to the above resins, also contain the following resin in an amount accounting for not more than 20% by weight of the whole binder.

Examples of the additional resin are those having a weight average molecular weight of 10,000 to 200,000 which include vinyl chloride-vinyl acetate copolymer, vinyl chloride-vinylidene chloride copolymer, vinyl chloride-acrylonitrile copolymer, butadiene-acrylonitrile copolymer, polyamide resin, polyvinyl butyral, cellulose derivatives such as nitrocellulose, styrene-butadiene copolymer, various synthetic rubber resins, phenol resin, epoxy resin, urea resin, melamine resin, phenoxy resin, silicone resin, acryl resin and urea-formamide resin. These resins each should contain a polar group mentioned above.

The magnetic layer of the invention preferably contains a polyisocyanate in order to improve the durability thereof. A usable aromatic polyisocyanate is, e.g., an adduct of tolylenediisocyanate (TDI) with an active hydrogen compound. A useful aliphatic polyisocyanate is an adduct of hexamethylenediisocyanate (HMDI) with an active hydrogen compound. The weight average molecular weight of the polyisocyanate is preferably in the range of 100 to 3,000.

According to the magnetic recording medium of the invention, the specific polar group-introduced high Tg resin and low Tg resin, particularly the low Tg resin, improve the dispersibility, filling rate and orientation of the ferromagnetic powder and residual magnetic flux density of the magnetic layer is raised. Further, the smoothness of the magnetic layer surface is also improved due to the calendering characteristic of the low Tg resin. As a result, satisfactory electromagnetic conversion characteristics can be obtained. Also, the high Tg resin improves the layer strength, resulting in preventing a magnetic head from clogging and improving the runability of the magnetic recording medium.

In forming the above magnetic layer, there may, if necessary, be added additives such as a dispersing agent, a lubricant, an abrasive, an antistatic angent and a filler.

Useful examples of the dispersing agent include fatty acids having 12 to 18 carbon atoms such as caprylic acid, capric acid, lauric acid, myristic acid, palmitic acid, stearic acid, oleic acid, and alkali metal salts or alkaline earth metal salts and amides thereof: polyalkylene-oxide-alkyl phosphates: lecithin: trialkylpolyolefinoxy quaternary ammonium salts: and azo compounds having carboxyl and sulfon acid groups. These dispersing agents may be used in the range of 0.5 to 5% by weight to the magnetic powder.

As the lubricant, a fatty acid and/or a fatty acid ester may be used. In this instance, the adding amount of the fatty acid is preferably 0.2 to 10% by weight, and more preferably 0.2 to 5% by weight. The adding amount of the fatty acid ester is preferably 0.2 to 10% by weight, and more preferably 0.5 to 5% by weight. To make the above effects better, the ratio by weight of the fatty acid:the fatty acid ester is preferably 10:90 to 90:10.

The fatty acid may be either a monobasic acid or a dibasic acid and has preferably 6 to 30 carbon atoms, and more preferably 12 to 22 carbon atoms. Examples of the fatty acid include caproic acid, caprylic acid, capric acid, lauric acid, myristic acid, palmitic acid, stearic acid, isostearic acid, linolenic acid, linolic acid, oleic acid, elaidic acid, behenic acid, malonic acid, succinic acid, maleic acid, glutaric acid, adipic acid, pimelic acid, azelaic acid, sebacic acid, 1,12-dodecanedicarboxylic acid and octanedicarboxylic acid.

Examples of the fatty acid ester include oleyl oleate, isocetyl stearate, dioleyl maleate, butyl stearate, butyl palmitate, butyl myristate, octyl myristate, octyl palmitate, pentyl stearate, pentyl palmitate, isobutyl oleate, stearyl stearate, lauryl oleate, octyl oleate, isobutyl oleate, ethyl oleate, isotridecyl oleate, 2-ethylhexyl stearate, ethyl stearate, 2-ethylhexyl palmitate, isopropyl palmitate, isopropyl myristate, butyl laurate, cetyl-2-ethyl caproate, dioleyl adipate, diethyl adipate, diisobutyl adipate, diisodecyl adipate, oleyl stearate, 2-ethylhexyl myristate, isopentyl palmitate, isopentyl stearate, diethylene glycol-monobutyl-ether palmitate and diethylene glycol-monobutyl-ether palmiate.

Besides the above fatty acids and fatty acid esters, to the magnetic layer may also be added other lubricants such as silicone oil, graphite, carbon fluoride, molybdenum disulfide, tungsten disulfide, fatty acid amides and α-olefin oxide.

Examples of the abrasive include α-alumina, fused alumina, chromium oxide, titanium oxide, α-iron oxide, silicon oxide, silicon nitride, silicon carbide, molybdenum carbide, tungsten carbide, boron carbide, corundum, zirconium oxide, zinc oxide, cerium oxide, magnesium oxide and boron nitride. The average particle size of these abrasives is preferably 0.05 to 0.6 μm, and more preferably 0.1 to 0.3 μm. Examples of the antistatic agent include conductive powders such as carbon black and graphite: cationic surfactants such as quaternary amines: anionic surfactants containing acid groups such as of sulfonic acid, sulfuric acid, phosphoric acid, phosphates and carboxylic acid: amphoteric surfactants such as aminosulfonic acids: and natural surfactants such as saponin. Any of the above antistatic agents may be added in the range of normally 0.01 to 40% by weight to the binder.

A solvent is used in preparation of a magnetic paint for the formation of the above magnetic layer. Examples of the solvent include ketones such as acetone, methylethyl ketone, methylisobutyl ketone and cyclohexanone: aromatic hydrocarbons such as benzene, toluene and xylene: alcohols such as methanol, ethanol, propanol and butanol: esters such as methyl acetate, ethyl acetate and butyl acetate: cyclic ethers such as tetrahydrofuran: and halogenated hydrocarbons such as methylene chloride, ethylene chloride, carbon tetrachloride, chloroform and dichlorobenzene.

The magnetic paint used in the invention is prepared by kneading and dispersing in a solvent the magnetic powder, binder, dispersing agent, lubricant, abrasive and antistatic agent. The kneading and dispersion of the magnetic powder are carried out in a kneader-disperser. Examples of the kneader-disperser include a biroll mill, triroll mill, ball mill, tron mill, pebble mill, coboll mill, sand mill, sand grinder, Szegvari attritor, high-speed impeller disperser, high-speed impact mill, high-speed stone mill, disper, high-speed mixer, homogenizer, ultrasonic disperser, oven kneader, continuous kneader and pressure kneader.

Examples of the nonmagnetic support used in the invention include polyesters such as polyethylene terephthalate and polyethylene-2,6-naphthalate: polyolefins such as polypropylene: cellulose derivatives such as cellulose diacetate and cellulose triacetate: polycarbonate and polyamide.

The magnetic recording medium of the invention, as shown in the drawing, is of a construction comprising a nonmagnetic support 1 made of, e.g., polyethylene terephthalate, a magnetic layer 2 provided thereon and, if necessary, a backing layer provided on the opposite side to the layer 2. Further, on the magnetic layer 2 may be provided an overcoat layer (OC layer). Also, an undercoat layer (UC layer) may be provided between the magnetic layer and the support. The nonmagnetic support may be subjected to corona discharge treatment.

For forming the above magnetic layer on the nonmagnetic support may be used any one of the following coating methods: air-doctor coating, air-knife coating, blade coating, squeeze coating, impregnation coating, transfer coating, reverse-roll coating, kiss coating, gravure coating, cast coating and spray coating.

The magnetic layer coated on the nonmagnetic support is dried with magnetic field orientation, and then calendered for surface smoothing treatment. After that, the layer, if necessary, is varnished or subjected to blade treatment and then slit.

The present invention is applicable to magnetic tapes, magnetic disks, and the like.

EXAMPLES

In the following examples, the 'parts' all represents parts by weight.

EXAMPLE 1

The following composition was dispersed by kneading with a ball mill for 24 hours: filtered through a 0.5 μm filter: 5 parts of a polyfunctional isocyanate Coronate L, manufactured by Nippon Polyurethane Co., were added thereto: then the prepared magnetic paint was coated so as to form a layer 2.5 μm in thickness on a nonmagnetic support and dried while being oriented by a 4,000-gauss magnet: and then subjected to supercalender treatment.

| | |
|---|---|
| Ferromagnetic composition | 100 parts |
| Ferromagnetic metal powder | |
| (Fe/Al ratio by weight: 95/5 | |

-continued

| | |
|---|---|
| Hc: 1580 Oe, σs: 120 emu/g | |
| BET specific surface area: 55.5 m²/g) | |
| Vinyl chloride copolymer | 12 parts |
| Polyurethane | 8 parts |
| α-alumina (average particle size: 0.2 μm) | 8 parts |
| Carbon black (average particle size: 55 nm) | 0.5 part |
| BET specific surface area: 32 m²/g | |
| DBP oil absorption: 180 ml/100 g) | |
| Oleic acid | 1 part |
| Stearic acid | 1 part |
| Butyl stearate | 1 part |
| Cyclohexanone | 100 parts |
| Methylethyl ketone | 100 parts |
| Toluene | 100 parts |

In the above composition, the vinyl chloride copolymer and the polyurethane resin are those synthesized according to the following methods:

Vinyl Chloride Copolymer

In a polymerization reactor were put 130 parts of demineralized water, 0.6 part of methyl cellulose, 0.2 part of polyoxyethylenesorbitol-partial fatty acid ester and 0.52 part of trioxyethylene: the reactor was decompressed; then 87 parts of vinyl chloride and 20 parts of dicidyl methacrylate were added: and then the mixture was stirred at 58° C. After that, 0.42 part of 3,3,5-trimethylhexanoyl peroxide was added to initiate the polymerization of the reaction system, and at the same time, 4 parts of a solution of sodium 2-acrylamide-2-methyl-propanesulfonate dissolved in 40 parts of methanol was added continuously at a constant rate so that its whole quantity was added in 8 hours. At a point of time when the inside pressure of the polymerization reactor became 3 kg/cm² after 12 hours of the reaction, the reaction system was cooled, whereby a vinyl chloride copolymer was obtained. The obtained copolymer was one having a polymerization degree of 380 and a glass transition point of 60° C.: composed of 88% vinyl chloride, 9% glycidyl methacrylate and 3% sodium 2-acrylamido-2-methylpropanesulfonate: and having a hydroxyl group produced due to the partial ring-opening of the epoxy group.

Polyurethane

In a polymerization reactor were put 264 g of dimethyl 5-sodium-sulfonisophthalate, 944 g of 1,6-hexanediol, 416 g of neopentyl glycol, 0.45 g of zinc acetate and 0.06 g of sodium acetate, and the reaction thereof took place at a temperature of 140° to 220° C. for two hours. Next, 1020 g of adipic acid were added to make another reaction for two hours: the reaction system was decompressed spending 30 minutes down to 20 mmHg: then further down to 5 to 20 mmHg: and the polymerization reaction thereof was made under the reduced pressure at 250° C. for 50 minutes to thereby synthesize a polyester polyol comprised in combination in a molar ratio of dimethyl 5-sodium-sulfoisophthalate:adipic acid:1,6-hexanediol:neopentyl-glycol=4.8:43.3:34.2:17.7.

Subsequently, in a reactor the reaction of 500 g of the above polyester polyol, 600 g of toluene, 450 g of methylisobutyl ketone, 35 g of diphenylmethanediisocyanate and 0.5 g of dibutyltin-dilaurate was performed at 70° to 90° C. for 8 hours to thereby obtain a polyurethane having a glass transition point of −20° C. and containing 0.3 mole % polymerized dimethyl 5-sodium-sulfoisophthalate.

Afterward, a paint having the following composition was coated to form a backcoat layer 0.8 μm in thickness on the opposite side of the support to the magnetic layer, and the film was slit into 8 mm-wide tapes, whereby an 8 mm video tape sample was prepared.

| | |
|---|---|
| Carbon black (average particle size 50 nm) | 40 parts |
| Barium sulfate | 10 parts |
| Nitrocellulose | 25 parts |
| N-2301 (produced by Nippon Polyurethane) | 25 parts |
| Coronate L (produced by Nippon Polyurethane) | 10 parts |
| Cyclohexanone | 400 parts |
| Methylethyl ketone | 250 parts |
| Toluene | 250 parts |

COMPARATIVE EXAMPLE 1

A comparative 8 mm video tape sample was prepared in the same manner as in Example 1 except that the above polyurethane was replaced by the following one:

Polyurethane

In a polymerization reactor, the reaction of 157 g of dimethyl 5-sodium-sulfoisophthalate, 582 g of dimethyl terephthalate, 434 g of ethylene glycol, 728 g of neopentyl glycol, 0.86 g of zince acetate and 0.08 g of sodium acetate took place at 140° C. to 220° C. for two hours: 1212 g of sebacic acid Were added thereto to make another reaction for two hours: the reaction system was decompressed spending 30 minutes down to 20 mmHg: then further down to 5 to 20 mmHg: and then the polymerization reaction thereof was made at 250° C. for 50 minutes to thereby synthesize a polyester polyol comprised in combination in a molar ratio of dimethyl 5-sodium-sulfoisophthalate:terephthalic acid:sebacic acid:ethylene glycol:neopentyl glycol=2.9:15.3:30.7:22.5:28.6.

Next, in a polymerization reactor, the reaction of 500 g of the above polyester polyol, 600 g of toluene, 450 g of methylisobutyl ketone, 35 g of diphenylmethanediisocyanate and 0.5 g of dibutyl tin-dilaurate took place at 70° to 90° C. for 8 hours to produce a polyurethane containing 0.26 mole % polymerized dimethyl 5-sodium-sulfoisophthalate and having a glass transition point of 20° C.

EXAMPLE 2

A polyurethane having a glass transition point of 0° C. was synthesized in the same manner as in Comparative Example 1 except that the amounts, 582 g of the dimethyl terephthalate and 1212 g of the sebacic acid, were changed to 291 g and 1616 g, respectively, and the polyurethane was used to produce an 8 mm video tape sample.

EXAMPLE 3

An 8 mm video tape sample was produced in the same manner as in Example 2 except that the vinyl chloride copolymer in Example 2 was replaced by a vinyl chloride-vinyl acetate-maleic anhydride copolymer having a glass transition point of 75° C. and a polymerization degree of 400 (400x110A, product of Japanese Geon Co.).

EXAMPLE 4

An 8 mm video tape sample was produced in the same manner as in Example 1 except that the BET value of the magnetic powder was changed to 55 m²/g.

EXAMPLE 5

An 8 mm video tape sample was produced in the same manner as in Example 1 except that the raw material having the polar group —$SO_3Na$ used in synthesizing the polyurethane and vinyl chloride copolymer of Example 1 was replaced by one having —$SO_3K$.

EXAMPLE 6

An 8 mm video tape sample was produced in the same manner as in Example 1 except that the raw material having the polar group —$SO_3Na$ used in synthesizing the polyurethane and vinyl chloride copolymer of Example 1 was replaced by one having —$SO_3H$.

EXAMPLE 7

An 8 mm video tape sample was produced in the same manner as in Example 1 except that the raw material having the polar group —$SO_3Na$ used in synthesizing the polyurethane and vinyl chloride copolymer of Example 1 was replaced by one having —$OSO_3Na$.

EXAMPLE 8

An 8 mm video tape sample was produced in the same manner as in Example 1 except that the raw material having the polar group —$SO_3Na$ used in synthesizing the polyurethane and vinyl chloride copolymer of Example 1 was replaced by one having —COOH.

EXAMPLE 9

An 8 mm video tape sample was produced in the same manner as in Example 1 except that the raw material having the polar group —$SO_3Na$ used in synthesizing the polyurethane and vinyl chloride copolymer of Example 1 was replaced by one having —$PO(ONa)_2$.

EXAMPLE 10

An 8 mm video tape sample was produced in the same manner as in Example 1 except that the raw material having the polar group —$SO_3Na$ used in synthesizing the polyurethane and vinyl chloride copolymer of Example 1 was replaced by one having —$PO(OCH_3)_2$.

COMPARATIVE EXAMPLE 2

An 8 mm video tape sample was produced in the same manner as in Comparative Example 1 except that the vinyl chloride copolymer was replaced by 400x110A.

COMPARATIVE EXAMPLE 3

An 8 mm video tape sample was produced in the same manner as in Example 1 except that the ferromagnetic powder having the BET specific surface area of 55.5 $m^2/g$ of Example 1 was replaced by one having a BET specific surface area of 53.0 $m^2/g$.

COMPARATIVE EXAMPLE 4

An 8 mm video tape sample was produced in the same manner as in Comparative Example 1 except that the ferromagnetic powder having the BET specific surface area of 55.5 $m^2/g$ of Comparative Example 1 was replaced by one having a BET specific surface area of 53.0 $m^2/g$.

COMPARATIVE EXAMPLE 5

An 8 mm video tape sample was produced in the same manner as in Example 1 except that the polyurethan of Example 1 was replaced by one with no polar group and having a glass transition point of −20° C.

COMPARATIVE EXAMPLE 6

An 8 mm video tape sample was produced in the same manner as in Example 1 except that the vinyl chloride copolymer of Example 1 was replaced by one with no polar group and having a glass transition point of 60° C.

COMPARATIVE EXAMPLE 7

An 8 mm video tape sample was produced in the same manner as in Example 1 except that the polyurethane and the vinyl chloride copolymer of Example 1 were replaced by a polyurethane with no polar group and having a glass transition point of −20° C. and a vinyl chloride copolymer with no polar group and having a glass transition point of 60° C., respectively.

The glass transition point (Tg), Br, Ra, RF output and head clogging of each of the above 8 mm video tape samples were measured. The results are shown in the following table.

Glass transition point:
A temperature at the flection point of tan δ measured with a dynamic viscoelasticity tester RHEOVIBRON DDV-II-EA, manufactured by Toyo Baldwin Co.

Br:
A residual magnetic flux density measured with a VSM-3S, manufactured by Toei Industry Co.

Ra:
A center line average roughness measured under the condition of stylus of 2.5×0.1 $\mu m^2$ by a Taristep, manufactured by Rank Tailor Hobson Corp.

|  | Magnetic powder BET value | High Tg resin | Low Tg resin | Tg difference | Br | Ra | RF output | Head clogging |
| --- | --- | --- | --- | --- | --- | --- | --- | --- |
| Example 1 | 55.5 $m^2/g$ | 60° C. | −20° C. | 80° C. | 2820 G | 3 nm | 2.5 dB | Non |
| Example 2 | 55.5 $m^2/g$ | 60° C. | 0° C. | 60° C. | 2800 G | 3 nm | 2.7 dB | Non |
| Example 3 | 55.5 $m^2/g$ | 75° C. | 0° C. | 75° C. | 2800 G | 3 nm | 2.5 dB | Non |
| Example 4 | 55.0 $m^2/g$ | 60° C. | −20° C. | 80° C. | 2810 G | 3 nm | 2.4 dB | Non |
| Example 5 | 55.5 $m^2/g$ | 60° C. | −20° C. | 80° C. | 2830 G | 3 nm | 2.6 dB | Non |
| Example 6 | 55.5 $m^2/g$ | 60° C. | −20° C. | 80° C. | 2800 G | 3 nm | 2.7 dB | Non |
| Example 7 | 55.5 $m^2/g$ | 60° C. | −20° C. | 80° C. | 2820 G | 3 nm | 2.5 dB | Non |
| Example 8 | 55.5 $m^2/g$ | 60° C. | −20° C. | 80° C. | 2830 G | 3 nm | 2.6 dB | Non |
| Example 9 | 55.5 $m^2/g$ | 60° C. | −20° C. | 80° C. | 2810 G | 3 nm | 2.4 dB | Non |
| Example 10 | 55.5 $m^2/g$ | 60° C. | −20° C. | 80° C. | 2810 G | 3 nm | 2.7 dB | Non |
| Comp. Ex. 1 | 55.5 $m^2/g$ | 60° C. | 20° C. | 40° C. | 2560 G | 5 nm | 0.7 dB | Present |
| Comp. Ex. 2 | 55.5 $m^2/g$ | 75° C. | 20° C. | 55° C. | 2540 G | 5 nm | 0.8 dB | Present |
| Comp. Ex. 3 | 53.0 $m^2/g$ | 60° C. | −20° C. | 80° C. | 2520 G | 6 nm | 0.0 dB | Present |
| Comp. Ex. 4 | 53.0 $m^2/g$ | 60° C. | 20° C. | 40° C. | 2520 G | 6 nm | 0.0 dB | Present |

-continued

|  | Magnetic powder BET value | High Tg resin | Low Tg resin | Tg difference | Br | Ra | RF output | Head clogging |
|---|---|---|---|---|---|---|---|---|
| Comp. Ex. 5 | 55.5 m²/g | 60° C. | −20° C.* | 80° C. | 2480 G | 6 nm | 0.0 dB | Present |
| Comp. Ex. 6 | 55.5 m²/g | 60° C.* | −20° C. | 80° C. | 2500 G | 6 nm | 0.0 dB | Present |
| Comp. Ex. 7 | 55.5 m²/g | 60° C.* | −20° C.* | 80° C. | 2400 G | 8 nm | −0.6 dB | Present |

*Resin with no polar group.

As is apparent from the above table, where the specific surface area of the magnetic powder is less than 55 m²/g, there is almost no difference in the tape characteristics between the samples regardless of whether the difference in Tg between the high Tg resins and the low Tg resins is less than or not less than 60° C. However, where the specific surface area of the ferromagnetic powder is not less than 55 m²/g, the difference in Tg less than 60° C. between the high Tg resins and the low Tg resins reduces the effect of making the ferromagnetic powder fine particulate, while the difference in Tg not less than 60° C. increases the effect. The difference in Tg not less than 60° C. prevents head clogging and improves the surface characteristic and durability of the magnetic layer. Further, the incorporation of a polar group into the resin improves the dispersibility of the magnetic powder to result in even better improvement of the electromagnetic conversion characteristics of the magnetic layer.

What is claimed is:

1. A magnetic recording medium comprising a nonmagnetic support and a magnetic layer which comprises a ferromagnetic powder having a specific surface area of not less than 55 m²/g and at least two kinds of resins each containing repetitive units having a polar group selected from the group consisting of a —SO$_3$M group, a —OSO$_3$M group, a —COOM group and a —PO(OM')$_2$ group, wherein M is a hydrogen atom or an alkali metal atom, and M' is a hydrogen atom, an alkali metal atom or an alkyl group, and the glass transition points of said two kinds of resins are different not less than 60° C. from each other.

2. The recording medium of claim 1, wherein the difference between the glass transition points of said two resins is not less than 65° C.

3. The recording medium of claim 1, wherein the difference between the glass transition points of said two resins is within the range of from 70° C. to 100° C.

4. The recording medium of claim 1, wherin a resin having higher glass transition point among said two kinds of resins has a glass transition point of from than 50° C. to 90° C.

5. The recording medium of claim 4, wherein said resins having higher glass transition point has a glass transition point of from 55° C. to 85° C.

6. The recording medium of claim 1, wherein a resin having lower glass transition point among said two kinds of resins has a glass transition point of from −40° C. to 0° C.

7. The recording medium of claim 6, wherein said resin having lower glass transition point has a glass transition point of from −35° C. to −5° C.

8. The recording medium of claim 1, wherein a resin having higher glass transition point among said two resins is a vinyl chloride resin, a cellulose derivative, polyurethane resin, or polyester resin each having said polar group.

9. The recording medium of claim 1, wherein a resin having lower glass transition point among said two resins is a polyurethane resin or a polyester resin each having said polar group.

10. The recording medium of claim 1, wherein a molar ratio of repetitive units having said polar group to the total repetitive units contained in each of said two resins is within the range of from 0.1 to 8.0 mol %.

11. The recording medium of claim 1, wherein a molar ratio of repetitive units having said polar group to the total repetitive units contained in each of said two resins is within the range of from 0.5 to 5.0 mol %.

12. The recording medium of claim 1, wherein a resin having higher glass transition point to a resin having lower glass transition point are contained in said magnetic layer in a ratio of from 90:10 to 10:90.

13. The recording medium of claim 12, wherein a resin having higher glass transition point to a resin having lower glass transition point are contained in said magnetic layer in a ratio of from 70:30 to 30:70.

* * * * *